(12) United States Patent
Lu et al.

(10) Patent No.: US 12,520,240 B2
(45) Date of Patent: Jan. 6, 2026

(54) INFORMATION TRANSMISSION METHOD AND TERMINAL

(71) Applicant: VIVO MOBILE COMMUNICATION CO., LTD., Guangdong (CN)

(72) Inventors: Zhi Lu, Guangdong (CN); Xueming Pan, Guangdong (CN); Xiaodong Shen, Guangdong (CN); Na Li, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 467 days.

(21) Appl. No.: 17/579,000

(22) Filed: Jan. 19, 2022

(65) Prior Publication Data

US 2022/0141775 A1 May 5, 2022

Related U.S. Application Data

(63) Continuation of application No. PCT/CN2020/103531, filed on Jul. 22, 2020.

(30) Foreign Application Priority Data

Jul. 30, 2019 (CN) .......................... 201910696420.0

(51) Int. Cl.
*H04W 52/14* (2009.01)
*H04W 52/10* (2009.01)
(Continued)

(52) U.S. Cl.
CPC ......... *H04W 52/146* (2013.01); *H04W 52/10* (2013.01); *H04W 52/28* (2013.01); *H04W 72/0446* (2013.01); *H04W 72/23* (2023.01)

(58) Field of Classification Search
CPC ... H04W 52/146; H04W 52/10; H04W 52/28; H04W 72/0446; H04W 72/23; H04W 52/54; H04W 72/1268; H04L 5/0058
See application file for complete search history.

(56) References Cited

U.S. PATENT DOCUMENTS 11,943,774 B2 * 3/2024 Wong ..................... H04L 5/0053
2019/0029012 A1 1/2019 Wu et al.
(Continued)

FOREIGN PATENT DOCUMENTS

CN 108702776 A 10/2018
CN 109600836 A 4/2019
(Continued)

OTHER PUBLICATIONS

UCI enhancements for URLLC, 3GPP TSG RAN WG1 Meeting #96b, Apr. 8-12, 2019, R1-1903955, Huawei, HiSilicon, Xi'an, China (Year: 2019).*
(Continued)

*Primary Examiner* — Austin J Moreau
(74) *Attorney, Agent, or Firm* — IP & T GROUP LLP

(57) ABSTRACT

An information transmission method includes: in a case that time domain resources of at least two physical uplink channels in M physical uplink channels to be sent are overlapped, sending a target physical uplink channel by using a target power control parameter in power control parameters for the at least two physical uplink channels, where physical uplink information carried in the target physical uplink channel includes physical uplink information carried in each of the at least two physical uplink channels, each of the M physical uplink channels includes a PUCCH or a PUSCH, the physical uplink information includes uplink control information, and M is an integer greater than or equal to 2.

14 Claims, 4 Drawing Sheets

(51) Int. Cl.
*H04W 52/28* (2009.01)
*H04W 72/0446* (2023.01)
*H04W 72/23* (2023.01)

(56) References Cited

U.S. PATENT DOCUMENTS

| | | | |
|---|---|---|---|
| 2020/0053761 A1* | 2/2020 | Hosseini | H04W 72/21 |
| 2021/0037555 A1* | 2/2021 | Papasakellariou | H04L 1/0031 |
| 2021/0144702 A1 | 5/2021 | Zhao | |
| 2021/0168771 A1 | 6/2021 | Ma et al. | |
| 2021/0266911 A1* | 8/2021 | Zhao | H04L 1/1819 |
| 2022/0248410 A1* | 8/2022 | Lee | H04W 52/32 |
| 2024/0297704 A1* | 9/2024 | Zhou | H04B 17/17 |
| 2025/0016769 A1* | 1/2025 | Papasakellariou | H04L 1/1854 |

FOREIGN PATENT DOCUMENTS

| | | |
|---|---|---|
| CN | 109618362 A | 4/2019 |
| CN | 111435878 A | 7/2020 |
| EP | 3910853 A1 | 11/2021 |
| WO | 2017/132810 A1 | 8/2017 |

OTHER PUBLICATIONS

Discussion on eMBB and URLLC UCI multiplexing, 3GPP TSG RAN WG1 Meeting #93, May 21-25, 2018, R1-1806064, Vivo, Busan, Korea (Year: 2018).*

UCI enhancements for URLLC, 3GPP TSG RAN WG1 Meeting #96b, Apr. 8-12, 2019, R1-1903955, Huawei, HiSilicon, Xi'an, China.

Summary#2 on UCI enhancements for URLLC, 3GPP TSG RAN WG1 #96bis, Apr. 8-12, 2019, R1-190xxxx, OPPO, Xi'an, China.

Correction on PUCCH and UCI multiplexing for NR, 3GPP TSG RAN WGH1 Meeting #94, Aug. 20-24, 2018, R1-1808491, LG Electronics, Gothenburg, Sweden.

The First Office Action of Priority Application No. CN 201910696420.0 issued by the Chinese Patent Office on Mar. 24, 2021.

The Second Office Action of Priority Application No. CN 201910696420.0 issued by the Chinese Patent Office on Sep. 9, 2021.

International Search Report and Written Opinion of Priority Application No. PCT/CN2020/103531 issued by the Chinese Patent Office on Oct. 28, 2020.

* cited by examiner

INFORMATION TRANSMISSION METHOD AND TERMINAL

CROSS-REFERENCE TO RELATED APPLICATIONS

This application is a Bypass Continuation Application of PCT/CN2020/103531 filed on Jul. 22, 2020, which claims priority to Chinese Patent Application No. 201910696420.0 filed on Jul. 30, 2019, which are incorporated herein by reference in their entirety.

TECHNICAL FIELD

Embodiments of this application relates to the field of communications, and in particular, to an information transmission method and a terminal.

BACKGROUND

Compared with the previous mobile communications technologies, the 5th-generation (5G) mobile communication technology needs to adapt to more diverse scenarios and service requirements. Main scenarios of 5G include enhanced mobile broadband (eMBB), ultra-reliable and low latency communications (URLLC), and massive machine type communication (mMTC). These scenarios impose requirements such as high reliability, low latency, large bandwidth, and wide coverage on the 5G system.

SUMMARY

According to a first aspect, an embodiment of this application provides an information transmission method, applied to a terminal and including:
  in a case that time domain resources of at least two physical uplink channels in M physical uplink channels to be sent are overlapped, sending a target physical uplink channel by using a target power control parameter in power control parameters for the at least two physical uplink channels, where physical uplink information carried in the target physical uplink channel includes physical uplink information carried in each of the at least two physical uplink channels, each of the M physical uplink channels includes a physical uplink control channel (PUCCH) or a physical uplink shared channel (PUSCH), the physical uplink information includes uplink control information, and M is an integer greater than or equal to 2.

According to a second aspect, an embodiment of this application provides an information transmission method, applied to a network side device and including:
  receiving a target physical uplink channel sent by a terminal by using a target power control parameter in power control parameters for at least two physical uplink channels, where the at least two physical uplink channels are physical uplink channels that are in M physical uplink channels to be sent by the terminal and whose time domain resources are overlapped, physical uplink information carried in the target physical uplink channel includes physical uplink information carried in each of the at least two physical uplink channels, each of the M physical uplink channels includes a PUCCH or a PUSCH, the physical uplink information includes uplink control information, and M is an integer greater than or equal to 2.

According to a third aspect, an embodiment of this application provides an information transmission apparatus, applied to a terminal and including:
  a channel sending module, configured to: in a case that time domain resources of at least two physical uplink channels in M physical uplink channels to be sent are overlapped, send a target physical uplink channel by using a target power control parameter in power control parameters for the at least two physical uplink channels, where physical uplink information carried in the target physical uplink channel includes physical uplink information carried in each of the at least two physical uplink channels, each of the M physical uplink channels includes a PUCCH or a PUSCH, the physical uplink information includes uplink control information, and M is an integer greater than or equal to 2.

According to a fourth aspect, an embodiment of this application provides an information transmission apparatus, applied to a network side device and including:
  a channel receiving module, configured to: receive a target physical uplink channel sent by a terminal by using a target power control parameter in power control parameters for at least two physical uplink channels, where the at least two physical uplink channels are physical uplink channels that are in M physical uplink channels to be sent by the terminal and whose time domain resources are overlapped, physical uplink information carried in the target physical uplink channel includes physical uplink information carried in each of the at least two physical uplink channels, each of the M physical uplink channels includes a PUCCH or a PUSCH, the physical uplink information includes uplink control information, and M is an integer greater than or equal to 2.

According to a fifth aspect, an embodiment of this application provides a terminal, including a processor, a memory, and a computer program stored in the memory and executable on the processor, where when the computer program is executed by the processor, steps of the information transmission method in the first aspect are implemented.

According to a sixth aspect, an embodiment of this application provides a network side device, including a processor, a memory, and a computer program stored in the memory and executable on the processor, where when the computer program is executed by the processor, steps of the information transmission method in the second aspect are implemented.

According to a seventh aspect, an embodiment of this application provides a non-transitory computer-readable storage medium, where the non-transitory computer-readable storage medium stores a computer program, and when the computer program is executed by a processor, steps of the foregoing information transmission method are implemented.

BRIEF DESCRIPTION OF DRAWINGS

It may be better understood from the following descriptions of implementations of this application with reference to the accompanying drawings that same or similar reference numerals represent same or similar features in this application.

DETAILED DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

Usually, some terminals (namely, user equipment (UE)) may support different services. For example, a terminal may support both a URLLC service and a large-capacity and high-rate eMBB service. During transmission of an eMBB service, a URLLC service may also need to be transmitted. In this case, time domain resources for transmitting the eMBB service and those for transmitting the URLLC service may be overlapped, which damages uplink single carrier characteristics of UE.

Therefore, uplink control information (UCI) of different services may need multiplexing transmission. However, reliability requirements for different services are different. Therefore, how to meet transmission requirements for control information of different services is a problem needing to be urgently solved.

Figure 1:
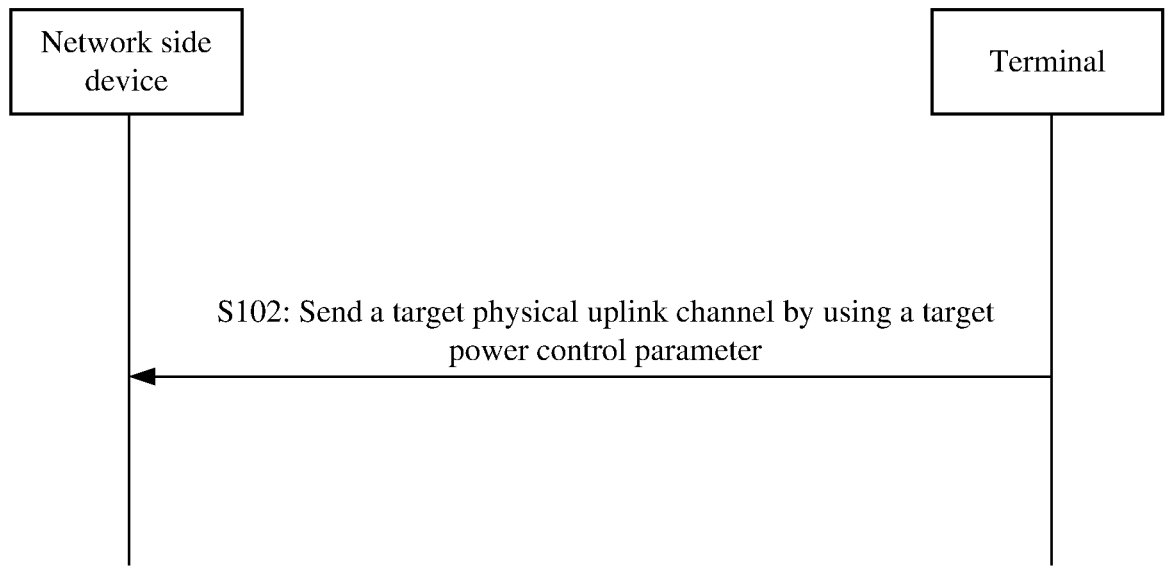
FIG. 1 is a diagram of a time sequence of an information transmission method according to an embodiment of this application.

FIG. 1 is a diagram of a time sequence of an information transmission method according to an embodiment of this application. As shown in FIG. 1, the information transmission method includes the following step:

S102: In a case that time domain resources of at least two physical uplink channels in M physical uplink channels to be sent are overlapped, a terminal sends a target physical uplink channel by using a target power control parameter in power control parameters for the at least two physical uplink channels, where physical uplink information carried in the target physical uplink channel includes physical uplink information carried in each of the at least two physical uplink channels, each of the M physical uplink channels includes a PUCCH or a PUSCH, the physical uplink information includes UCI, and M is an integer greater than or equal to 2.

In this embodiment of this application, for at least two physical uplink channels whose time domain resources are overlapped, a proper target power control parameter is used to send physical uplink information of a plurality of services to be carried in the at least two physical uplink channels whose time domain resources are overlapped. This embodiment of this application is applicable to resolution of a conflict between different channels and signals for determining different numerologies in new radio (NR). In addition, the target power control parameter is configured properly, thereby properly configuring transmit power required when the physical uplink information of the plurality of services multiplexes the physical uplink channels. This can meet a reliability index of a high-reliability service, thereby meeting transmission requirements for control information of different services.

Figure 2:
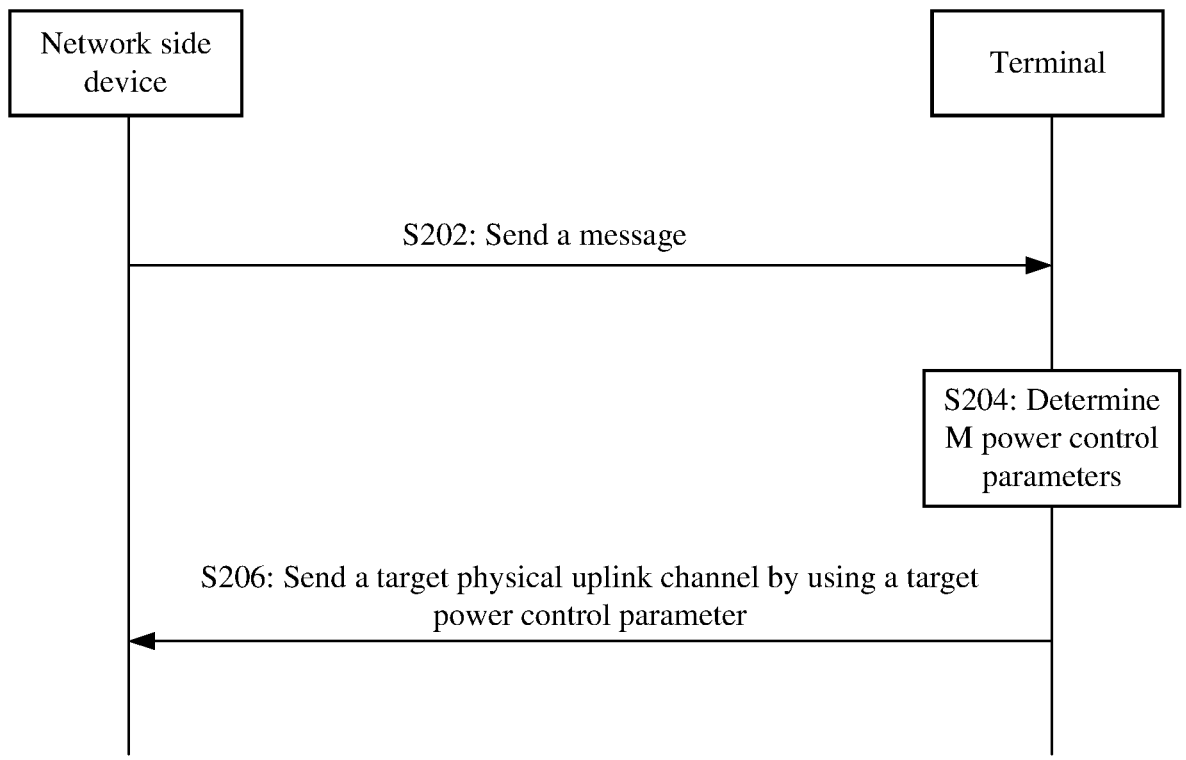
FIG. 2 is a diagram of a time sequence of an information transmission method according to another embodiment of this application.

FIG. 2 is a diagram of a time sequence of an information transmission method according to another embodiment of this application. As shown in FIG. 2, the information transmission method includes the following steps:

S202: A network side device sends a message to a terminal, where the message is downlink control information (DCI) or configuration information.

S204: The terminal receives the message and determines M power control parameters based on the message, where the M power control parameters are power control parameters for M physical uplink channels to be sent, each of the M physical uplink channels carries physical uplink information, the physical uplink information includes UCI, each physical uplink channel includes a PUCCH or a PUSCH, and M is an integer greater than or equal to 2.

It should be noted that the M power control parameters are pre-configured by a network.

The foregoing information transmission method further includes S206: In a case that time domain resources of at least two physical uplink channels in the M physical uplink channels are overlapped, the terminal sends a target physical uplink channel by using a target power control parameter in power control parameters for the at least two physical uplink channels, where physical uplink information carried in the target physical uplink channel includes physical uplink information carried in each of the at least two physical uplink channels, that is, the target physical uplink channel carries the physical uplink information that needs to be originally carried in the at least two physical uplink channels whose time domain resources are overlapped.

For the information transmission method shown in FIG. 1 or FIG. 2, there are the following two example manners for determining the target physical uplink channel:

Manner 1

The terminal determines the target physical uplink channel based on the at least two physical uplink channels whose time domain resources are overlapped.

Manner 2

The network side device indicates the foregoing target physical uplink channel for the terminal, that is, the message sent by the network side device to the terminal includes indication information of the foregoing target physical uplink channel.

The target physical uplink channel determined in manner 1 or manner 2 may be one of the at least two physical uplink channels whose time domain resources are overlapped, or may be a third physical uplink channel other than the at least two physical uplink channels whose time domain resources are overlapped.

For the information transmission method shown in FIG. 1 or FIG. 2, there are the following two example manners for obtaining the target power control parameter:

Manner 1: The terminal determines the target power control parameter based on the target physical uplink channel.

Manner 2: The network side device indicates the target power control parameter for the terminal. For example, the message sent by the network side device to the terminal includes indication information of the target power control parameter used for sending the target physical uplink channel.

In a case that the at least two physical uplink channels whose time domain resources are overlapped include a first physical uplink channel and a second physical uplink channel, the target power control parameter and the target physical uplink channel in manner 1 or manner 2 are as follows:

The target physical uplink channel is the first physical uplink channel, and the target power control parameter is a first power control parameter for the first physical uplink channel.

Alternatively, the target physical uplink channel is the first physical uplink channel, and the target power control parameter is a second power control parameter for the second physical uplink channel. A priority of the second power control parameter is higher than a priority of the first power control parameter.

Alternatively, the target physical uplink channel is the second physical uplink channel, and the target power control parameter is the second power control parameter for the second physical uplink channel.

Alternatively, the target physical uplink channel is a third physical uplink channel, the target power control parameter is the second power control parameter for the second physical uplink channel, and the third physical uplink channel is a physical uplink channel other than the at least two physical uplink channels.

For example, the first physical uplink channel is a physical uplink channel of an eMBB service, and the second physical uplink channel is a physical uplink channel of a URLLC service.

The following uses an example to describe sending different target physical uplink channels by using different target power control parameters.

For example, in a case that a time domain resource of the physical uplink channel of the eMBB service is overlapped with a time domain resource of the physical uplink channel of the URLLC service, UCI of eMBB and UCI of URLLC are multiplexed on one physical uplink channel (namely, the target physical uplink channel). When they are multiplexed on a physical uplink channel, different target power control parameters may be used. The following three cases are used as examples for description.

1. The UCI of eMBB and the UCI of URLLC are multiplexed on the physical uplink channel of the eMBB service.
  (1) The terminal uses the power control parameter for the eMBB service (namely, the target power control parameter) to send the physical uplink channel of eMBB (namely, the target physical uplink channel) based on open loop power control or closed loop power control. The physical uplink channel of eMBB carries the UCI of eMBB and the UCI of URLLC.
  (2) The terminal uses the power control parameter for URLLC (namely, the target power control parameter) to send the physical uplink channel of eMBB (namely, the target physical uplink channel) based on open loop power control or closed loop power control. The physical uplink channel of eMBB carries the UCI of eMBB and the UCI of URLLC.

From the perspective of reliability, because transmit power corresponding to the power control parameter for URLLC is usually greater than transmit power corresponding to the power control parameter for eMBB, reliability of transmission of control information of the URLLC service can be ensured.

In a case that the power control parameter for URLLC is used to send a PUCCH of eMBB, because the URLLC service requires high reliability, the PUCCH may be sent at a relatively high power level. As a result, when the PUCCH of eMBB is configured for multi-user multiplexing, because the PUCCH is sent at the relatively high power level, interference to other eMBB users may be caused.

Based on this, in a case that the PUCCH of eMBB is configured for multi-user multiplexing, the network side device configures the PUCCH of eMBB not to be multiplexed with other users.

In a case that the PUCCH of eMBB is not configured for multi-user multiplexing, the PUCCH of eMBB can carry not only UCI of eMBB, but also UCI of other types of services.

2. The UCI of eMBB and the UCI of URLLC multiplex the physical uplink channel of URLLC.

The terminal uses the power control parameter for URLLC (namely, the target power control parameter) to send the physical uplink channel of URLLC (namely, the target physical uplink channel) based on open loop power control or closed loop power control. The physical uplink channel of URLLC carries the UCI of eMBB and the UCI of URLLC.

3. The UCI of eMBB and the UCI of URLLC multiplex a third physical uplink channel other than the physical uplink channel of eMBB and the physical uplink channel of URLLC.

The terminal uses the power control parameter for URLLC (namely, the target power control parameter) to send the third physical uplink channel (namely, the target physical uplink channel) based on open loop power control or closed loop power control. The third physical uplink channel carries the UCI of eMBB and the UCI of URLLC.

The following three example manners may be used to determine the third physical uplink channel:
  (1) A PUCCH resource indicator (PRI) field of DCI of eMBB may indicate a pair of PUCCHs, namely, a PUCCH pair, where one of the PUCCHs is used to carry only the UCI of eMBB, and the other PUCCH is used to carry UCI of a plurality of types of services.
  (2) A PRI field of DCI of URLLC may indicate a pair of PUCCHs, namely, a PUCCH pair, where one of the PUCCHs is used to carry only the UCI of URLLC, and the other PUCCH is used to carry UCI of a plurality of types of services.
  (3) A periodic PUCCH resource is configured separately by a high-level parameter to carry UCI of a plurality of types of services.

In an embodiment of this application, the terminal determines a service corresponding to a to-be-sent physical uplink channel based on DCI sent by the network side device. The DCI is DCI corresponding to the to-be-sent physical uplink channel.

In a case that a format of the DCI is a specific format, or the DCI includes a modulation and coding scheme (MCS) table having low-spectrum efficiency, for example, MCS table index 3, or the DCI uses a specific radio network temporary identifier (RNTI) for scrambling, for example, MCS-C-RNTI, it is determined that the to-be-sent physical uplink channel is corresponding to the URLLC service.

In a case that the format of the DCI is not a specific format, or the MCS table included in the DCI does not have low-spectrum efficiency, or the DCI does not use a specific RNTI for scrambling, the to-be-sent physical uplink channel is determined according to the eMBB service.

In an embodiment of this application, the target power control parameter is an open loop power transmission parameter (OLPTP).

For example, for a physical uplink channel that is to be sent and that corresponds to the eMBB service, the terminal uses OLPTP1 to send the physical uplink channel; and for a physical uplink channel that is to be sent and that corresponds to the URLLC service, the terminal uses OLPTP2 to send the physical uplink channel.

Therefore, the terminal uses OLPTP1 to send the physical uplink channel of eMBB; or the terminal uses OLPTP2 to send the physical uplink channel of URLLC.

Power control of a PUSCH can be calculated by using the following formula (1):

$$P_{PUSCH,b,f,c}(i, j, q_d, l) = \min\{P_{DMAX,f,c}(i), P_{0\_PUSCH,b,f,c}(j) + 10\log_{10}(2^{\mu} \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i, l)\} \quad (1)$$

Power control of a PUCCH can be calculated by using the following formula (2):

$$P_{PUCCH,b,f,c}(i, q_u, q_d, l) = \min\{P_{CMAX,f,c}(i), P_{0\_PUCCH,b,f,c}(q_u) + 10\log_{10}(2^{\mu} \cdot M_{RB,b,f,c}^{PUCCH}(i)) + PL_{b,f,c}(q_d) \cdot \Delta_{F\_PUCCH}(F) + \Delta_{TF,b,f,c}(i) + g_{b,f,c}(i, l)\} \quad (2)$$

In formula (1) and formula (2), units of $P_{PUSCH,b,f,c}(i, j, q_d, l)$ and $P_{PUCCH,b,f,c}(i, q_u, q_d, l)$ are dBm.

Each OLPTP includes P0 and path loss compensation $\alpha_{b,f,c,s}(j)$, each OLPTP further includes path loss reference $PL_{b,f,c,s}(q_d)$ where $q_d$ is a reference signal index (RSindex). The subscript s in the foregoing parameter can be used to differentiate between different services or priorities. It should be noted that, the subscript s also needs to be added to the foregoing formula.

Because OLPTPs of different physical uplink channels are different, for different physical uplink channels, the network side device may configure different OLPTPs based on the following parameters:

1. The to-be-sent physical uplink channel is a PUSCH.

P0 is a sum of parameters $P_{0\_NOMINAL\_PUSCH,f,c,s}(j)$ and $P_{0\_UE\_PUSCH,b,f,c,s}(j)$, where b denotes an uplink bandwidth part (BWP), f denotes a carrier, c denotes a serving cell, s denotes a service or a priority. For example, two services (the two services is the eMBB service and the URLLC service) are supported. For the URLLC service, s may be 1; or the eMBB service, s may be 0. In a case that the PUSCH is a dynamically scheduled PUSCH, j is equal to 0; and in a case that the PUSCH is a configured grant PUSCH, j is equal to 1.

(1) The to-be-sent physical uplink channel is a dynamically scheduled PUSCH.

$P_{0\_NOMINAL\_PUSCH,f,c,s}(j)$ is provided by high-layer parameter p0-NominalWithGrant. Set $P_{0\_UE\_PUSCH,b,f,c,s}(j)$ is provided by set p0 in P0-PUSCH-AlphaSet in high-layer parameter set p0-PUSCH-AlphaSetId. $\alpha_{b,f,c,s}(j)$ is provided by alpha in P0-PUSCH-AlphaSet in high-layer parameter set p0-PUSCH-AlphaSetId. $PL_{b,f,c,s}(q_d)$ is calculated by the terminal using reference signal index $q_d$. The reference signal index is provided by high-layer parameter PUSCH-PathlossReference-Id.

(2) The to-be-sent physical uplink channel is a configured grant PUSCH.

$P_{0\_NOMINAL\_PUSCH,f,c,s}(j)$ is provided by high-layer parameter p0-NominalWithoutGrant. Set $P_{0\_UE\_PUSCH,b,f,c,s}(j)$ is provided by set p0 in p0-PUSCH-Alpha in high-layer parameter ConfiguredGrantConfig. $\alpha_{b,f,c,s}(j)$ is provided by alpha in p0-PUSCH-Alpha in high-layer parameter ConfiguredGrantConfig. $PL_{b,f,c,s}(q_d)$ is calculated by the terminal using reference signal index $q_d$. RS resource index $q_d$ is provided by high-layer parameter pathlossReferenceIndex.

2. The to-be-sent physical uplink channel is a PUCCH.

P0 is a sum of parameters of $P_{0\_NOMINAL\_PUCCH,s}$ and $P_{0\_UE\_PUCCH,s}(q_u)$, where s denotes a service or a priority, for example, the eMBB service or the URLLC service. For the URLLC service, s may be 1; and for the eMBB service, s may be 0. $P_{0\_NOMINAL\_PUCCH,s}$ is provided by high-layer parameter p0-nominal (if the parameter does not exist, 0 dbm is used). $P_{0\_UE\_PUCCH,s}(q_u)$ is provided by p0-PUCCH-Value.

In an embodiment of this application, the target power control parameter is a closed loop power control parameter.

Because closed loop power control parameters for different physical uplink channels are different, for different physical uplink channels, the network side device may configure different closed loop power control parameters based on the following parameters:

1. The to-be-sent physical uplink channel is a PUCCH.

In a case that the message sent by the network side device to the terminal includes parameter PUCCH-SpatialRelationInfo, the terminal may obtain a mapping from a set of values of pucch-SpatialRelationInfoId and a set of values of p0-PUCCH-Value based on an index provided by p0-PUCCH-Id. The terminal determines a value of l (the value of l denotes a closed loop index, closedLoopIndex, namely, a closed loop power control parameter) based on $q_u$ of pucch-SpatialRelationInfoId. pucch-SpatialRelationInfoId is associated with p0-PUCCH-Id of $q_u$ and the value of l, where $0 \leq q_u < Q_u$, where $Q_u$ denotes a size of a set of values of $P_{0\_UE\_PUCCH}$, and is provided by parameter maxNrofPUCCH-P0-PerSet.

The network side device may configure two parameters, namely, parameter PUCCH-PC-AdjustmentStates (denoted by the value of l) and parameter PUCCH-SpatialRelationInfo.

For example, when configuring a physical uplink channel related to an eMBB service of UE, a network uses parameter 1 of PUCCH-SpatialRelationInfo. A value of PUCCH-PC-AdjustmentStates l is 0.

When configuring a physical uplink channel related to a URLLC service of the UE, the network uses parameter 2 of PUCCH-SpatialRelationInfo. A value of PUCCH-PC-AdjustmentStates l is 1.

Parameter 1 of PUCCH-SpatialRelationInfo may be the same as or different from parameter 2 of PUCCH-SpatialRelationInfo.

The UE determines a service corresponding to a corresponding physical uplink channel based on a physical layer parameter or signaling such as DCI, and sends uplink control information by using a power control parameter for the corresponding service.

2. The to-be-sent physical uplink channel is a PUSCH.

In a case that a high layer provides parameter SRI-PUSCH-PowerControl, the network side device configures mapping between the SRI field and the value of l, that is, two values of l (closedLoopIndex) may be indicated to the terminal. For example, the network side device may configure a value of l of URLLC to 1 and a value of l of the eMBB service to 0.

The terminal may determine different values of l based on a physical layer parameter or signaling. The terminal determines transmit power of PUSCHs of different services based on the different values of l.

(1) For a dynamically scheduled PUSCH, the SRI field may be determined as shown in table 1:

The SRI field indicated in dynamic DCI may be associated with two values of l. For example, a specific value to be used can be determined by determining, based on a physical layer parameter or signaling such as DCI, a specific service corresponds to a corresponding physical uplink channel, and uplink control information is then sent by using a power control parameter for the corresponding service.

TABLE 1

| SRI value | | |
|---|---|---|
| 00 | For eMBB | l is equal to 0, |
| | For URLLC | l is equal to 1, |

(2) SRI fields and corresponding values of l of different configured grant PUSCHs may be configured by the network side device.

For example, when configuring the physical uplink channel related to the eMBB service of the UE, the network uses SRI parameter 1, where l is equal to 0.

When configuring the physical uplink channel related to the URLLC service of the UE, the network uses SRI parameter 2, where l is equal to 1.

SRI parameter 1 may be the same as or different from SRI parameter 2.

The information transmission method in the embodiments of this application is described below with reference to FIG. 3 to FIG. 5.

Figure 3:
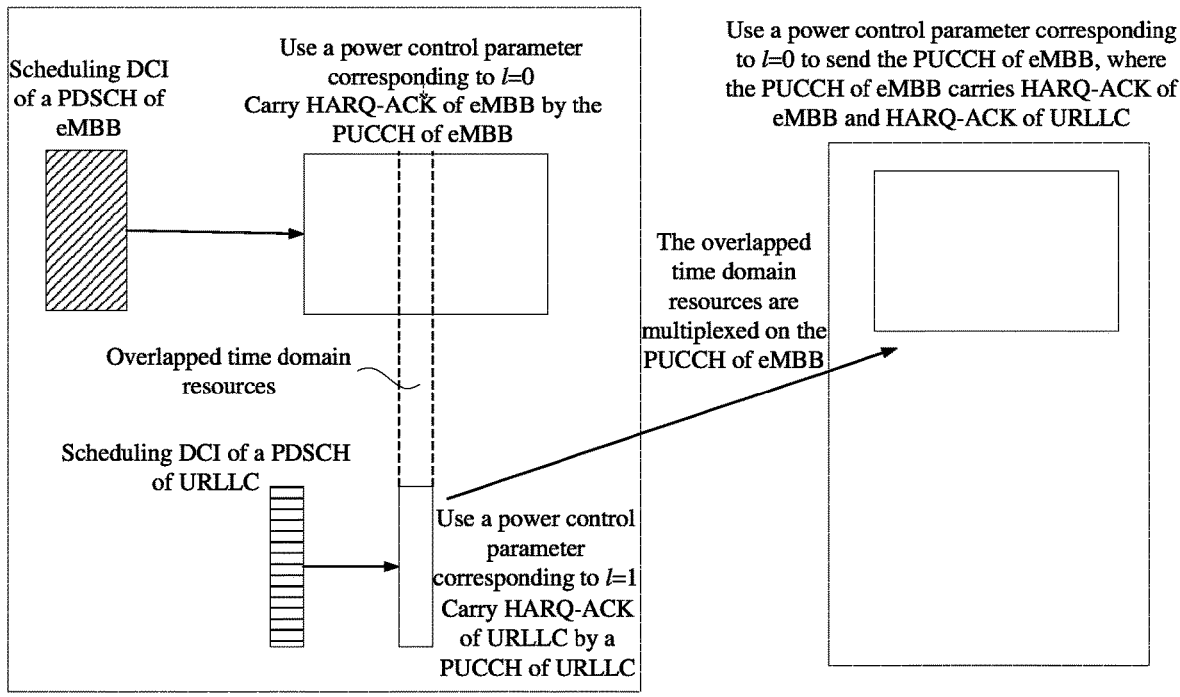
FIG. 3 is a schematic diagram of a principle of an information transmission method according to still another embodiment of this application.

FIG. 3 is a schematic diagram of a principle of an information transmission method according to still another embodiment of this application. As shown in FIG. 3, the power control parameter is determined as l that is equal to 0 based on scheduling DCI of a physical downlink shared channel (PDSCH) of eMBB. When l is equal to 0, the power control parameter is a power control parameter for a PUCCH of to-be-sent eMBB. The PUCCH of the eMBB is used to carry a hybrid automatic repeat request (HARD)-acknowledgement (ACK) of the eMBB.

The power control parameter is determined as l that is equal to 1 based on scheduling DCI of a PDSCH of URLLC. When l is equal to 1, the power control parameter is a power control parameter for a PUCCH of to-be-sent URLLC. The PUCCH of the URLLC is used to carry a HARQ-ACK of the URLLC.

In FIG. 3, time domain resources of a PUCCH of eMBB and a PUCCH of URLLC are overlapped. The time domain resources are multiplexed to the PUCCH of eMBB. On the overlapped time domain resources, the power control parameter l when is equal to 0 (namely, the target power control parameter) is used to send a PUCCH (namely, the target physical uplink channel) of eMBB. The PUCCH of the eMBB carries the HARQ-ACK of the eMBB and the HARQ-ACK of the URLLC.

Figure 4:
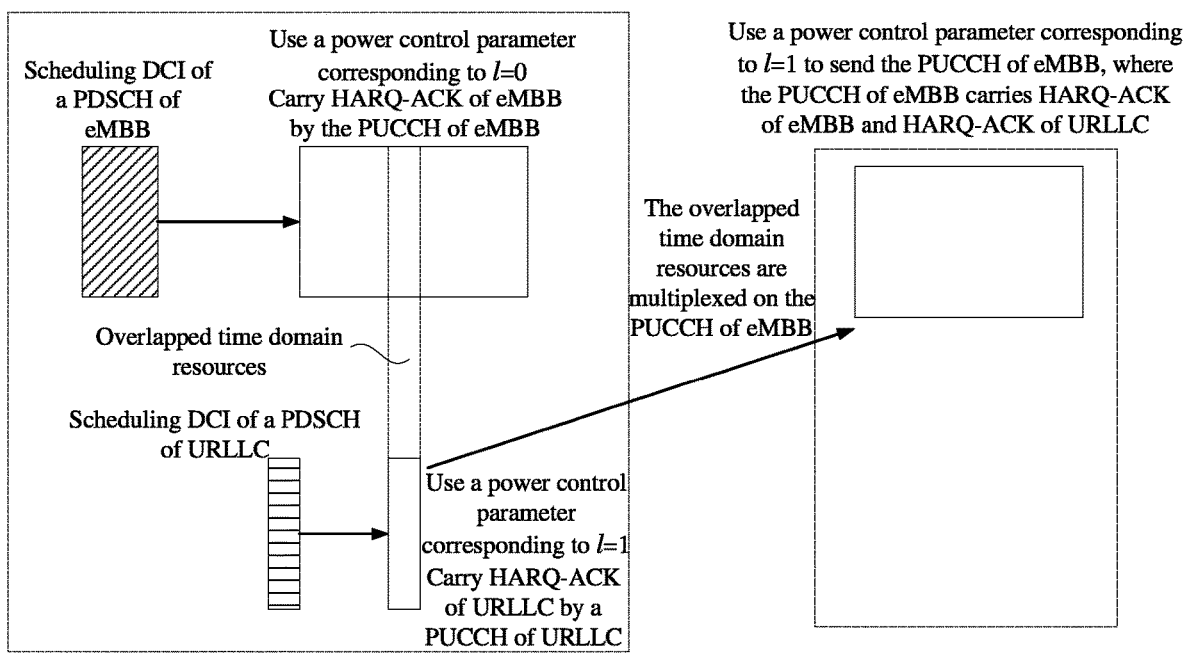
FIG. 4 is a schematic diagram of a principle of an information transmission method according to yet another embodiment of this application.

FIG. 4 is a schematic diagram of a principle of an information transmission method according to yet another embodiment of this application. In both FIG. 4 and FIG. 3, the time domain resources are multiplexed to the PUCCH of the eMBB. A difference between FIG. 4 and FIG. 3 lies in that: in FIG. 3, the power control parameter l when is equal to 0 is used to send the PUCCH of the eMBB; and in FIG. 4, the power control parameter l when is equal to 1 is used to send the PUCCH of the eMBB.

Figure 5:
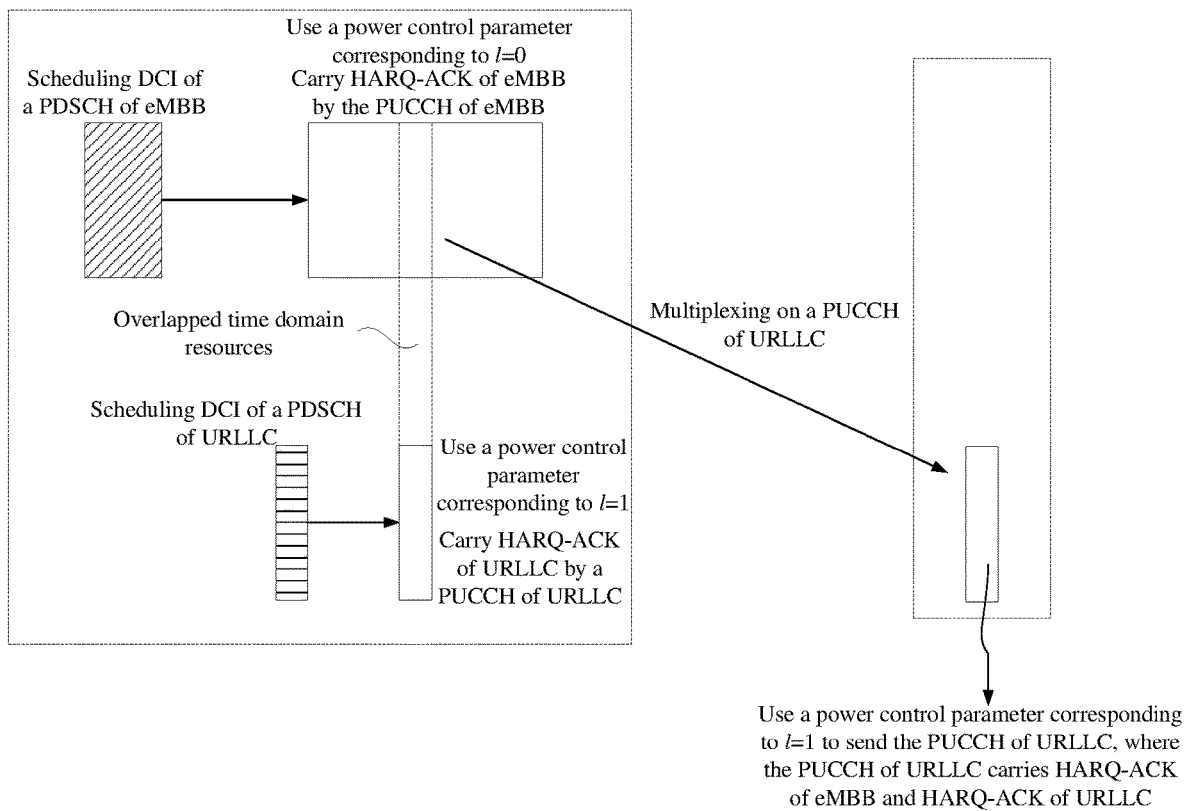
FIG. 5 is a schematic diagram of a principle of an information transmission method according to still yet another embodiment of this application.

FIG. 5 is a schematic diagram of a principle of an information transmission method according to still yet another embodiment of this application. A difference between FIG. 5 and FIG. 3 lies in that: in FIG. 5, the time domain resources are multiplexed to the PUCCH of the URLLC. On the overlapped time domain resources, the power control parameter l when is equal to 1 is used to send the PUCCH of the URLLC. The PUCCH of the URLLC carries the HARQ-ACK of the eMBB and the HARQ-ACK of the URLLC.

In summary, in FIG. 3 to FIG. 5, the target power control parameter is a closed loop power control parameter. In both FIG. 3 and FIG. 4, the time domain resources are multiplexed to the PUCCH of the eMBB. However, the power control parameter for the PUCCH of the eMBB is used in FIG. 3, but the power control parameter for the PUCCH of the URLLC is used in FIG. 4. In FIG. 5, the time domain resources are multiplexed to the PUCCH of the URLLC, and the power control parameter for the PUCCH of the URLLC is used to send the PUCCH of the URLLC.

Figure 6:
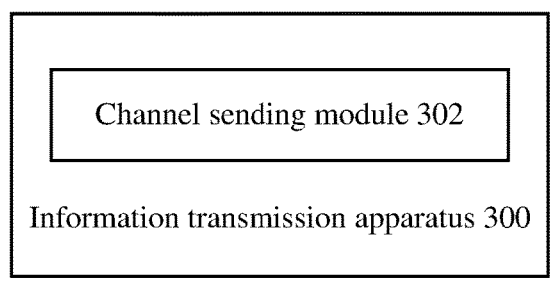
FIG. 6 is a schematic structural diagram of an information transmission apparatus according to an embodiment of this application.

FIG. 6 is a schematic structural diagram of an information transmission apparatus according to an embodiment of this application. The information transmission apparatus is applied to a terminal. As shown in FIG. 6, the information transmission apparatus 300 includes:

a channel sending module 302, configured to: in a case that time domain resources of at least two physical uplink channels in M physical uplink channels to be sent are overlapped, send a target physical uplink channel by using a target power control parameter in power control parameters for the at least two physical uplink channels, where physical uplink information carried in the target physical uplink channel includes physical uplink information carried in each of the at least two physical uplink channels, each of the M physical uplink channels includes a PUCCH or a PUSCH, the physical uplink information includes uplink control information, and M is an integer greater than or equal to 2.

In an embodiment of this application, the information transmission apparatus 300 further includes:

a message receiving module, configured to receive a message from a network side device, where the message is DCI or configuration information; and a parameter determining module, configured to determine M power control parameters based on the message, where the M power control parameters are power control parameters for the M physical uplink channels.

In this embodiment of this application, for at least two physical uplink channels whose time domain resources are overlapped, a proper target power control parameter is used to send physical uplink information of a plurality of services to be carried in the at least two physical uplink channels whose time domain resources are overlapped. The target power control parameter is configured properly, thereby properly configuring transmit power required when the physical uplink information of the plurality of services multiplexes the physical uplink channels. This can meet a reliability index of a high-reliability service, thereby meeting transmission requirements for control information of different services.

Figure 7:
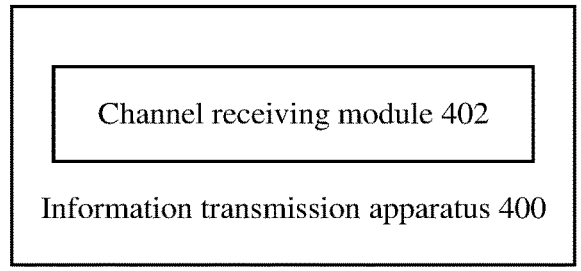
FIG. 7 is a schematic structural diagram of an information transmission apparatus according to another embodiment of this application.

FIG. 7 is a schematic structural diagram of an information transmission apparatus according to another embodiment of this application. The information transmission apparatus is applied to a network side device. As shown in FIG. 7, the information transmission apparatus 400 includes:

a channel receiving module 402, configured to: receive a target physical uplink channel sent by a terminal by using a target power control parameter in power control parameters for at least two physical uplink channels, where the at least two physical uplink channels are physical uplink channels that are in M physical uplink channels to be sent by the terminal and whose time domain resources are overlapped, physical uplink information carried in the target physical uplink channel includes physical uplink information carried in each of the at least two physical uplink channels, each of the M physical uplink channels includes a PUCCH or a PUSCH, the physical uplink information includes uplink control information, and M is an integer greater than or equal to 2.

In an embodiment of this application, the information transmission apparatus 400 further includes:

a message sending module, configured to send a message to a terminal, where the message is DCI or configuration information and used to determine M power control parameters, and the M power control parameters are power control parameters for the M physical uplink channels.

In this embodiment of this application, for at least two physical uplink channels whose time domain resources are overlapped, a proper target power control parameter is used to send physical uplink information of a plurality of services to be carried in the at least two physical uplink channels whose time domain resources are overlapped. The target power control parameter is configured properly, thereby properly configuring transmit power required when the physical uplink information of the plurality of services multiplexes the physical uplink channels. This can meet a reliability index of a high-reliability service, thereby meeting transmission requirements for control information of different services.

Figure 8:
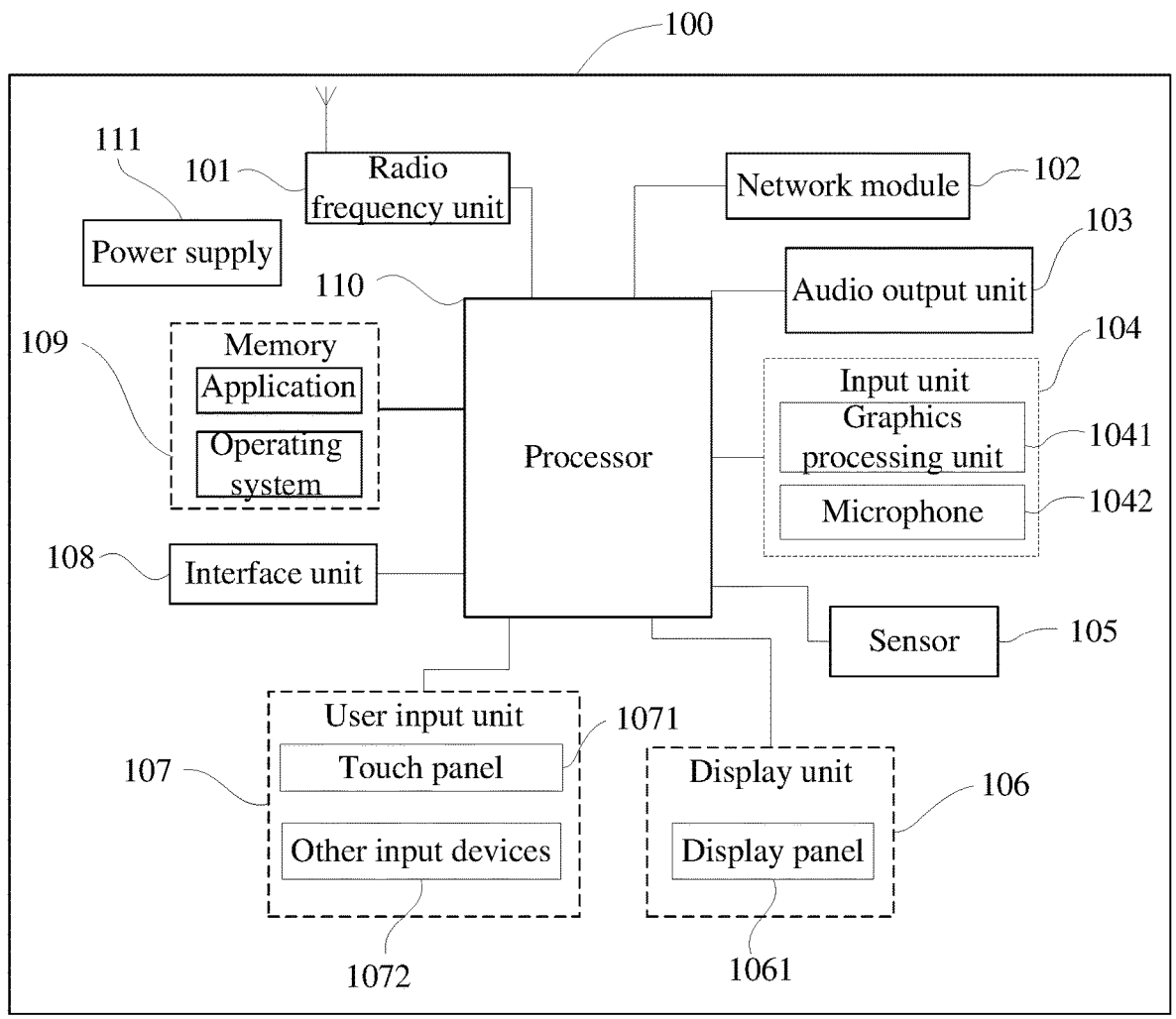
FIG. 8 is a schematic diagram of a hardware structure of a terminal according to an embodiment of this application.

FIG. 8 is a schematic diagram of a hardware structure of a terminal according to an embodiment of this application. As shown in FIG. 8, the terminal device 100 includes but is not limited to components such as a radio frequency unit 101, a network module 102, an audio output unit 103, an input unit 104, a sensor 105, a display unit 106, a user input unit 107, an interface unit 108, a memory 109, a processor 110, and a power supply 111. A person skilled in the art may understand that a structure of the terminal shown in FIG. 8 does not constitute a limitation on the terminal, and the terminal may include more or fewer components than those shown in the figure, or combine some components, or have different component arrangements. In this embodiment of this application, the terminal includes, but is not limited to, a mobile phone, a tablet computer, a notebook computer, a palmtop computer, a vehicle-mounted terminal, a wearable device, a pedometer, or the like.

The radio frequency unit 101 is configured to: in a case that time domain resources of at least two physical uplink channels in M physical uplink channels to be sent are overlapped, send a target physical uplink channel by using a target power control parameter in power control parameters for the at least two physical uplink channels, where physical uplink information carried in the target physical uplink channel includes physical uplink information carried in each of the at least two physical uplink channels, each of the M physical uplink channels includes a PUCCH or a PUSCH, the physical uplink information includes uplink control information, and M is an integer greater than or equal to 2.

In this embodiment of this application, for at least two physical uplink channels whose time domain resources are overlapped, a proper target power control parameter is used to send physical uplink information of a plurality of services carried in the at least two physical uplink channels whose time domain resources are overlapped. In this way, the target power control parameter is configured properly, thereby properly configuring transmit power required when the physical uplink information of the plurality of services multiplexes the physical uplink channels. This can meet a reliability index of a high-reliability service, thereby meeting transmission requirements for control information of different services.

It should be understood that, in this embodiment of this application, the radio frequency unit 101 may be configured to receive and transmit information, or receive and transmit signals during a call. For example, the radio frequency unit receives downlink data from a base station, and transmits the downlink data to the processor 110 for processing; and in addition, transmits uplink data to the base station. Generally, the radio frequency unit 101 includes, but is not limited to, an antenna, at least one amplifier, a transceiver, a coupler, a low noise amplifier, a duplexer, and the like. In addition, the radio frequency unit 101 may further communicate with another communications device through a wireless communication system and network.

The terminal provides a user with wireless broadband Internet access by using the network module 102, for example, helping the user send and receive emails, browse web pages, and access streaming media.

The audio output unit 103 may convert audio data received by the radio frequency unit 101 or the network module 102 or stored in the memory 109 into an audio signal, and output the audio signal into a sound. In addition, the audio output unit 103 may further provide audio output (for example, call signal receiving sound or message receiving sound) related to a specific function performed by the terminal 100. The audio output unit 103 includes a loudspeaker, a buzzer, a receiver, and the like.

The input unit 104 is configured to receive audio or video signals. The input unit 104 may include a graphics processing unit (GPU) 1041 and a microphone 1042. The graphics processing unit 1041 processes image data of a static picture or a video obtained by an image capturing apparatus (for example, a camera) in a video capturing mode or an image capturing mode. A processed image frame may be displayed on the display unit 106. The image frame processed by the graphics processing unit 1041 may be stored in the memory 109 (or another storage medium) or sent via the radio frequency unit 101 or the network module 102. The microphone 1042 may receive a sound and can process such sound into audio data. The processed audio data may be converted, in a call mode, into a format that may be sent to a mobile communication base station by using the radio frequency unit 101 for output.

The terminal 100 further includes at least one sensor 105, such as an optional sensor, a motion sensor, and another sensor. For example, the light sensor includes an ambient light sensor and a proximity sensor. The ambient light sensor can adjust brightness of a display panel 1061 based on brightness of ambient light. The proximity sensor can turn off the display panel 1061 and/or backlight when the terminal 100 approaches an ear. As a type of the motion sensor, an accelerometer sensor may detect magnitude of an acceleration in each direction (generally three axes), and may detect magnitude and a direction of gravity when being static. The accelerometer sensor may be used for recognizing a terminal gesture (for example, horizontal and vertical screen switching, a related game, or magnetometer posture calibration), a function related to vibration recognition (for example, a pedometer or a strike), or the like. The sensor 105 may further include a fingerprint sensor, a pressure sensor, an iris sensor, a molecular sensor, a gyroscope, a barometer, a hygrometer, a thermometer, an infrared sensor, and the like. This is not described herein.

The display unit 106 is configured to display information inputted by a user or information provided to a user. The display unit 106 may include the display panel 1061, and the display panel 1061 may be configured in a form of a liquid crystal display (LCD), an organic light-emitting diode (OLED), or the like.

The user input unit 107 may be configured to receive input digit or character information and generate key signal input related to user setting and function control of the terminal. For example, the user input unit 107 includes a touch panel 1071 and other input devices 1072. The touch panel 1071 is also referred to as a touchscreen, and may collect a touch operation performed by a user on or near the touch panel 1071 (such as an operation performed by a user on the touch panel 1071 or near the touch panel 1071 by using any proper object or accessory, such as a finger or a stylus). The touch panel 1071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, sends the point coordinates to the processor 110, and receives and executes a command sent by the processor 110. In addition, the touch panel 1071 may be of a resistive type, a capacitive type, an infrared type, a surface acoustic wave type, or the like. In addition to the touch panel 1071, the user input unit 107 may further include another input device 1072. For example, the other input devices 1072 may include but are not limited to a physical keyboard, a functional key (such as a volume control key or a power on/off key), a trackball, a mouse, and a keys ROM. Details are not described herein.

Optionally, the touch panel 1071 may cover the display panel 1061. When detecting the touch operation on or near the touch panel 1071, the touch panel 1071 transmits the touch operation to the processor 110 to determine a type of a touch event, and then the processor 110 provides corresponding visual output on the display panel 1061 based on the type of the touch event. Although the touch panel 1071 and the display panel 1061 are used as two separate components to implement input and output functions of the terminal in FIG. 8, in some embodiments, the touch panel 1071 and the display panel 1061 may be integrated to implement the input and output functions of the terminal. This is not limited herein.

The interface unit 108 is an interface connecting an external apparatus to the terminal 100. For example, the external apparatus may include a wired or wireless headset port, an external power supply (or a battery charger) port, a wired or wireless data port, a memory card port, a port for connecting an apparatus having an identification module, an audio input/output (I/O) port, a video I/O port, a headset port, and the like. The interface unit 108 may be configured to receive an input (for example, data information or power) from an external apparatus and transmit the received input to one or more elements in the terminal 100, or transmit data between the terminal 100 and the external apparatus.

The memory 109 may be configured to store software programs and various data. The memory 109 may mainly include a program storage area and a data storage area. The program storage area may store an operating system, an application for at least one function (for example, a sound play function or an image play function), and the like. The data storage area may store data (for example, audio data or an address book) or the like created based on use of the mobile phone. In addition, the memory 109 may include a high speed random access memory, and may further include a non-volatile memory, for example, at least one magnetic disk memory device, a flash memory device, or other non-volatile solid state memory devices.

The processor 110 is a control center of the terminal, and is connected to all parts of the entire terminal by using various interfaces and lines, and performs various functions of the terminal and processes data by running or executing the software program and/or a module that are stored in the memory 109 and invoking the data stored in the memory 109, to implement overall monitoring on the terminal. The processor 110 may include one or more processing units. Optionally, an application processor and a modem processor may be integrated into the processor 110. The application processor mainly processes an operating system, a user interface, an application, and the like. The modem processor mainly processes wireless communication. It can be understood that the above-mentioned modem processor may not be integrated in the processor 110.

The terminal 100 may further include a power supply 111 (such as a battery) that supplies power to each component. Optionally, the power supply 111 may be logically connected to the processor 110 by using a power management system, to implement functions such as charging, discharging, and power consumption management by using the power management system.

In addition, the terminal 100 includes some function modules not shown, and details are not described herein.

Optionally, an embodiment of this application further provides a terminal, including a processor, a memory, and a computer program stored in the memory and executable on the processor. When the computer program is executed by the processor, processes of the information transmission method embodiments are implemented, with the same technical effect achieved. To avoid repetition, details are not described herein again.

An embodiment of this application further provides a network side device, including a processor, a memory, and a computer program stored in the memory and executable on the processor. When the computer program is executed by the processor, steps of the foregoing information transmission method are implemented.

An embodiment of the application further provides a non-transitory computer-readable storage medium. The non-transitory computer-readable storage medium stores a computer program. When the computer program is executed by a processor, processes of the foregoing information transmission method embodiments are implemented, with the same technical effect achieved. To avoid repetition, details are not described herein again. The non-transitory computer-readable storage medium is, such as a read-only memory (ROM), a random access memory (RAM), a magnetic disk, or an optical disc.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. An element limited by "includes a . . . " does not, without more constraints, preclude the presence of additional identical elements in the process, method, article, or device that includes the element.

The flowcharts and block diagrams in the accompanying drawings illustrate system architectures, functions, and operations that may be implemented by the system, method, and computer program product according to the embodiments of this application. In this regard, each block in the flowcharts or block diagrams may represent a module, a segment, or a part of code, and the module, the segment, or the part of code includes one or more executable instructions for implementing specified logic functions. It should also be noted that, in some alternative implementations, functions marked in the blocks may also take place in an order different from the order marked in the accompanying drawings. For example, two consecutive blocks can actually be executed substantially in parallel, and they may sometimes be executed in a reverse order, which depends on involved functions. It should also be noted that each block in the flowcharts and/or block diagrams and combinations of the blocks in the flowcharts and/or block diagrams may be implemented by a dedicated hardware-based system for executing specified functions or actions, or may be implemented by a combination of dedicated hardware and computer instructions.

According to the foregoing descriptions of the implementations, a person skilled in the art may clearly understand that the method in the foregoing embodiments may be implemented by using software plus a required universal hardware platform, or certainly may be implemented by using hardware or software. However, in many cases, the former is a better implementation. Based on such an understanding, the technical solutions of this application essentially, or the part contributing to the prior art may be implemented in a form of a software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the foregoing implementations.

The foregoing implementations are merely schematic instead of restrictive. Under enlightenment of this application, a person of ordinary skills in the art may make many forms without departing from the protection scope of aims of this application and claims, all of which fall within the protection of this application.

What is claimed is:

1. An information transmission method, applied to a terminal and comprising:
in a case that time domain resources of at least two physical uplink channels in M physical uplink channels to be sent are overlapped, sending a target physical uplink channel by using a target power control parameter in power control parameters for the at least two physical uplink channels, wherein
the target physical uplink channel is a first physical uplink channel in the at least two physical uplink channels, and the target power control parameter is a first power control parameter for the first physical uplink channel; or
the target physical uplink channel is a second physical uplink channel in the at least two physical uplink channels, and the target power control parameter is a second power control parameter for the second physical uplink channel; wherein
a priority of the second power control parameter is higher than a priority of the first power control parameter; and
physical uplink information carried in the target physical uplink channel comprises physical uplink information carried in each of the at least two physical uplink channels, each of the M physical uplink channels comprises a physical uplink control channel (PUCCH) or a physical uplink shared channel (PUSCH), the physical uplink information comprises uplink control information, and M is an integer greater than or equal to 2.

2. The method according to claim 1, wherein the target power control parameter is an open loop power transmission parameter (OLPTP) or a closed loop power control parameter.

3. The method according to claim 1, further comprising:
receiving a message from a network side device, wherein the message is downlink control information (DCI) or configuration information; and
determining M power control parameters based on the message, wherein the M power control parameters are power control parameters for the M physical uplink channels.

4. An information transmission method, applied to a network side device and comprising:
receiving a target physical uplink channel sent by a terminal by using a target power control parameter in power control parameters for at least two physical uplink channels, wherein the at least two physical uplink channels are physical uplink channels that are in M physical uplink channels to be sent by the terminal and whose time domain resources are overlapped; wherein
the target physical uplink channel is a first physical uplink channel in the at least two physical uplink channels, and the target power control parameter is a first power control parameter for the first physical uplink channel; or
the target physical uplink channel is a second physical uplink channel in the at least two physical uplink channels, and the target power control parameter is a second power control parameter for the second physical uplink channel; wherein
a priority of the second power control parameter is higher than a priority of the first power control parameter; and
physical uplink information carried in the target physical uplink channel comprises physical uplink information carried in each of the at least two physical uplink channels, each of the M physical uplink channels comprises a physical uplink control channel (PUCCH) or a physical uplink shared channel (PUSCH), the physical uplink information comprises uplink control information, and M is an integer greater than or equal to 2.

5. The method according to claim 4, wherein the target power control parameter is an open loop power transmission parameter (OLPTP) or a closed loop power control parameter.

6. The method according to claim 4, further comprising:
sending a message to the terminal, wherein the message is downlink control information (DCI) or configuration information and used to determine M power control parameters, and the M power control parameters are power control parameters for the M physical uplink channels.

7. A terminal, comprising a processor, a memory, and a computer program stored in the memory and executable on the processor, wherein the computer program, when executed by the processor, causes the terminal to perform:

in a case that time domain resources of at least two physical uplink channels in M physical uplink channels to be sent are overlapped, sending a target physical uplink channel by using a target power control parameter in power control parameters for the at least two physical uplink channels, wherein the target physical uplink channel is a first physical uplink channel in the at least two physical uplink channels, and the target power control parameter is a first power control parameter for the first physical uplink channel; or the target physical uplink channel is a second physical uplink channel in the at least two physical uplink channels, and the target power control parameter is a second power control parameter for the second physical uplink channel; wherein a priority of the second power control parameter is higher than a priority of the first power control parameter; and physical uplink information carried in the target physical uplink channel comprises physical uplink information carried in each of the at least two physical uplink channels, each of the M physical uplink channels comprises a physical uplink control channel (PUCCH) or a physical uplink shared channel (PUSCH), the physical uplink information comprises uplink control information, and M is an integer greater than or equal to 2.

8. The terminal according to claim 7, wherein the target power control parameter is an open loop power transmission parameter (OLPTP) or a closed loop power control parameter.

9. The terminal according to claim 7, wherein the computer program, when executed by the processor, causes the terminal to further perform:

receiving a message from a network side device, wherein the message is downlink control information (DCI) or configuration information; and determining M power control parameters based on the message, wherein the M power control parameters are power control parameters for the M physical uplink channels.

10. A network side device, comprising a processor, a memory, and a computer program stored in the memory and executable on the processor, wherein when the computer program is executed by the processor, steps of the information transmission method according to claim 4 are implemented.

11. The network side device according to claim 10, wherein the target power control parameter is an open loop power transmission parameter (OLPTP) or a closed loop power control parameter.

12. The network side device according to claim 10, wherein the computer program, when executed by the processor, causes the network side device to further perform:

sending a message to the terminal, wherein the message is downlink control information (DCI) or configuration information and used to determine M power control parameters, and the M power control parameters are power control parameters for the M physical uplink channels.

13. A non-transitory computer-readable storage medium, wherein the computer-readable storage medium stores a computer program, and when the computer program is executed by a processor, steps of the information transmission method according to claim 1 are implemented.

14. A non-transitory computer-readable storage medium, wherein the computer-readable storage medium stores a computer program, and when the computer program is executed by a processor, steps of the information transmission method according to claim 4 are implemented.

* * * * *